(12) United States Patent
Karam, II

(10) Patent No.: US 6,346,809 B1
(45) Date of Patent: Feb. 12, 2002

(54) METHOD AND APPARATUS FOR TESTING DISK DRIVE READ/WRITE HEADS BY OSCILLATING A RECORDABLE MEDIUM

(76) Inventor: Raymond M. Karam, II, 226 E. Junipero, Santa Barbara, CA (US) 93105

(*) Notice: Subject to any disclaimer, the term of this patent is extended or adjusted under 35 U.S.C. 154(b) by 0 days.

(21) Appl. No.: 09/390,872

(22) Filed: Sep. 7, 1999

(51) Int. Cl.⁷ ............................................... G01R 33/12
(52) U.S. Cl. .......................... 324/210; 29/593; 324/235
(58) Field of Search .................................. 324/210, 211, 324/212, 252, 232, 235; 360/313; 29/593, 603.09

(56) References Cited

U.S. PATENT DOCUMENTS

| | | | |
|---|---|---|---|
| 3,706,926 A | * 12/1972 | Barrager et al. | ............ 324/210 |
| 3,710,235 A | * 1/1973 | Barrager et al. | ............ 324/210 |
| 5,589,771 A | * 12/1996 | Chur | ............ 324/212 |
| 5,854,554 A | * 12/1998 | Tomita et al. | ............ 324/210 |
| 5,898,303 A | * 4/1999 | Umanskiy et al. | ............ 324/210 |

* cited by examiner

Primary Examiner—Jay Patidar
(74) Attorney, Agent, or Firm—Nilles & Nilles, S.C.

(57) ABSTRACT

A method comprises manufacturing a read/write head for a disk drive; then testing the read/write head; and then mounting the read/write head to a suspension only after the testing step indicates that the read/write head is not defective. The testing may be performed by writing information to and reading information from a non-disc shaped media paddle that is caused to move back and forth with respect to the read/write head in oscillatory fashion.

17 Claims, 8 Drawing Sheets

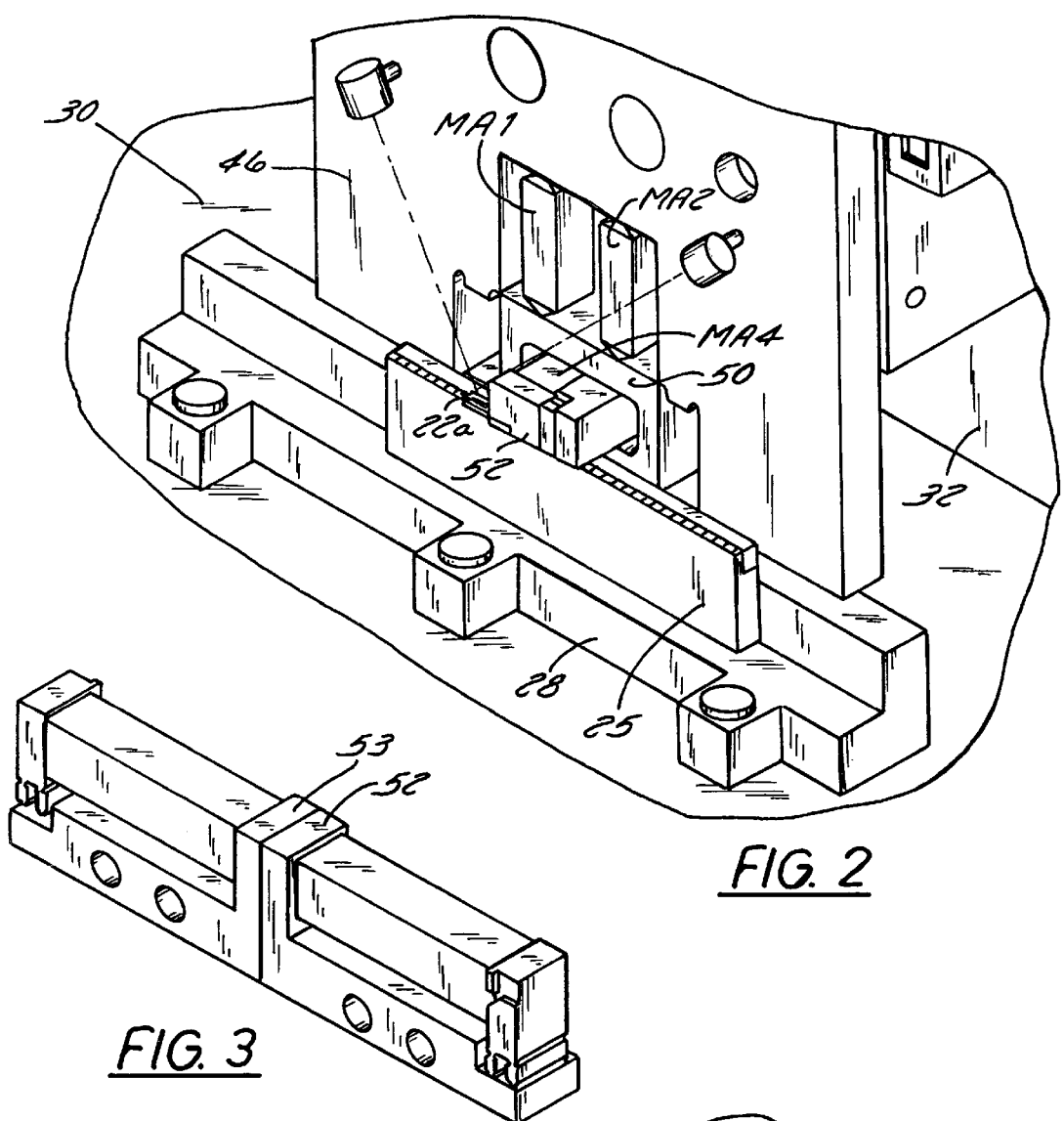
FIG. 2
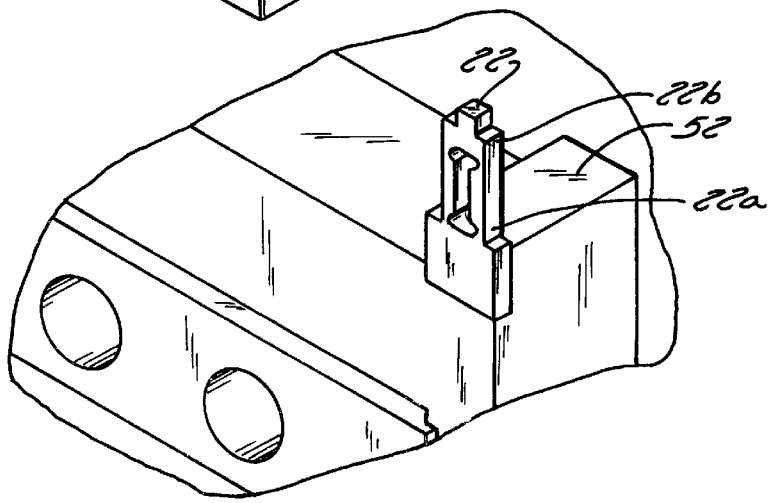
FIG. 3
FIG. 3A

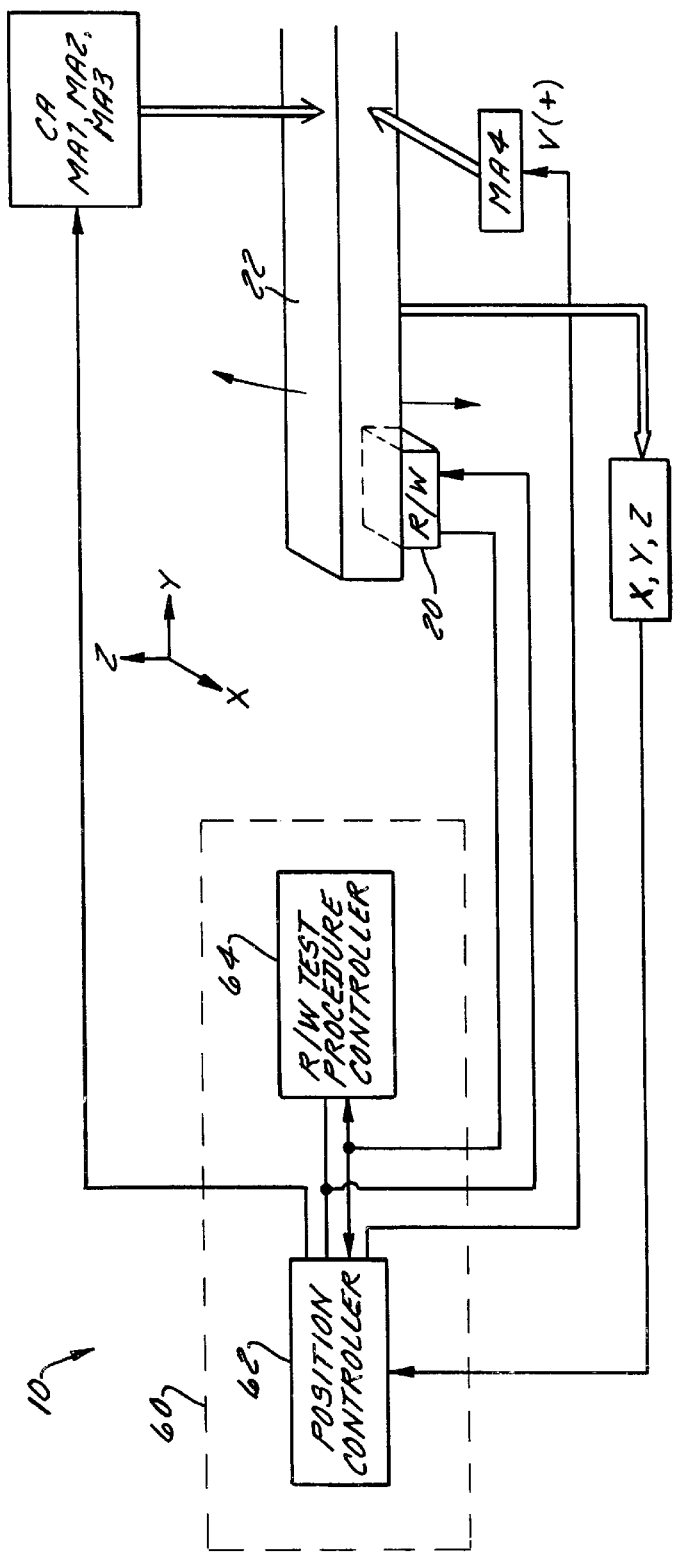
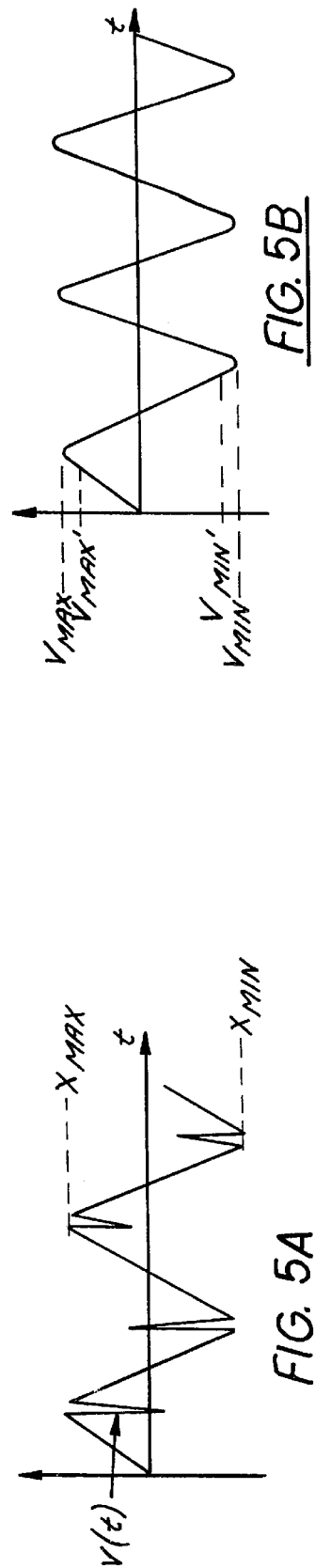
FIG. 4
FIG. 5A
FIG. 5B

METHOD AND APPARATUS FOR TESTING DISK DRIVE READ/WRITE HEADS BY OSCILLATING A RECORDABLE MEDIUM

BACKGROUND OF THE INVENTION

1. Field of the Invention

The present invention relates to a method and apparatus for testing disk drive read/write heads. In a particularly preferred embodiment, the present invention relates to a method in which a read/write head is tested before being mounted to a suspension, such that if the read/write head is found to be defective only the read/write head is wasted and not also a suspension and possibly a flexible circuit interconnect as well. In another particularly preferred embodiment, the present invention relates to a method of testing disk drive read/write heads in which a read/write head and a recordable medium such as a media paddle are caused to move back and forth with respect to each other in oscillatory fashion.

2. Description of Related Art

Hard disk drives are used in conjunction with computer systems for mass storage of information. Hard disk drives typically comprise one or more recordable media disks with a separate read/write head disposed on each side of each disk. For example, a particular arrangement may comprise a stack of ten disks and twenty read/write heads that are disposed on alternating sides of the ten disks. The placement of read/write heads on both sides of a disk permits information to be written to and read from both sides of the disk.

A typical read/write head comprises a read head and a write head both of which are disposed on a single substrate. Substrates typically are vitrified (glass) or oxidized metals (ceramics). There are a number of types of read heads such as AMR, GMR, inductive or optical read heads, as well as others. An MR head stripe has a change in a resistance that is a function of sensed magnetic field intensity. The write head is an inductive element that produces a magnetic field for recording information on a disk.

Conventionally, read/write heads are manufactured using a process that results in multiple read/write heads being disposed in a row on a single substrate wafer. Most such wafers today are $Al_2O_3TiC_2$ ("AlTiC"). The wafer is then sliced and a row is adhesively mounted on a "row bar" or "transfer tool" where the row is electronically lapped and then cut to produce discrete read/write heads (the opposite order is also possible as well as other processes). The individual read/write heads are then removed from the row bar, mounted to the suspension and then tested.

To test a read/write head, an arrangement is used that is quite similar in operation to a fully assembled disk drive. In particular, a spinning disk tester or "spinstand" tester is used in which the read/write head writes information to and reads information from the spinning disk as the spinning disk rotates. To enable the read/write head to be tested in this manner, the read/write head is first mounted to a suspension that maintains the read/write head in close proximity to the spinning disk. The suspension accommodates height variations of the read/write surface of the spinning disk, which is used as a recordable medium for writing and reading information, so as to maintain the proper gap between that surface and the read/write head. Typically, the read/write head is electrically connected to electronic test equipment by way of a flexible circuit interconnect that connects to connection pads on the read/write head.

If the read/write head passes the tests that are applied, then the read/write head, the suspension, and the flexible circuit interconnect are incorporated into a hard disk drive. The mounting of the read/write head to the suspension is therefore permanent to the extent that the read/write head remains mounted to the suspension when the read/write head is finally assembled into a disk drive. The same is also true with respect to the flexible circuit interconnect.

On the other hand, if the read/write head is found to be defective, then both the read/write head and the suspension are discarded. Thus, once the read/write head is mounted to the suspension, both the read/write head and the suspension are either used or not used. It is not cost-effective to attempt to remove the read/write head from the suspension and remount another read/write head to the suspension in the event that the read/write head is found to be defective. Again, the same is true with respect to the flexible circuit interconnect.

Economically, this approach is highly disadvantageous. It costs roughly the same amount to manufacture the suspension and mount the read/write head to the suspension as it costs to manufacture the read/write head itself. Further, a typical yield rate for read/write heads can vary between 5% to 90%. In other words, if the yield is 25%, for example, for every four read/write heads that are manufactured, an average of three will be found to be defective. Because both the read/write head and the suspension are discarded when the read/write head is defective, three out of four suspensions that are manufactured will be discarded, even though it is the read/write heads that are defective and not the suspensions. The fact that non-defective suspensions must be discarded, according to current read/write head testing methods costs the magnetic recording head industry millions of dollars per day or more in unnecessary waste. An alternative method and system in which read/write heads could be tested without mounting the read/write heads to a suspension, thereby reducing or eliminating unnecessary waste when a given read/write head is defective, would be extremely beneficial.

BRIEF SUMMARY OF THE INVENTION

To overcome these drawbacks of the prior art, the present invention provides improved methods and systems for testing disk drive read/write heads.

According to a first aspect of the invention, a method is provided that comprises manufacturing a read/write head for a disk drive; then testing the read/write head; and then mounting the read/write head to a suspension only after the testing step indicates that the read/write head is not defective. Preferably, the testing step further includes writing information to a recordable medium; and then reading the information from the recordable medium. During the performance of the writing and reading steps, the read/write head and the recordable medium are caused to move back and forth with respect to each other in oscillatory fashion without the recordable medium spinning. Preferably, the recordable medium is a non-disc shaped media paddle.

According to a second aspect of the invention, a method of testing a read/write head for a disk drive comprises causing the read/write head and a recordable medium to move back and forth with respect to each other in oscillatory fashion; and testing the read/write head while the read/write head and the recordable media are being caused to move with respect to each other. Preferably, the recordable medium oscillates and the read/write head is generally fixed. In an especially preferred embodiment, the recordable medium is a media paddle having first and second ends. The first end of the media paddle is fixedly mounted to a support structure. The second end moves immediately adjacent the read/write head, in particular, back and forth between first and second positions as the oscillator oscillates. The testing step then includes writing information to the second end of the media paddle using the read/write head and then reading the information from the second end of the media paddle using the read/write head.

According to a third aspect of the invention, an apparatus for testing a read/write head of a disk drive comprises an oscillator, a non-disc shaped recordable medium, and a processor. The oscillator preferably has a surface that oscillates in at least one dimension while testing and another dimension while landing. The oscillator is driven with a periodic signal but not necessarily a sinusoidal signal. Most preferably, the signal has regions in which the signal increases and decreases linearly between maxima and minima, to promote linear (constant speed) movement of the media paddle. To the extent that the driven paddle motion is nonlinear, the bit spacing will vary on the media but the readback frequency will not change (due to the fact that a similar variation in bit spacing occurred during writing) and thus all standard magnetic recording testing can be applied. The recordable medium is mechanically coupled to the oscillator, and is moveable in accordance with the movement of the surface of the oscillator. Thus, the recordable medium moves back and forth with respect to the read/write head in oscillatory fashion when the oscillator is driven with the periodic signal. Preferably, another identical oscillator which is driven out-of-phase mounted in a collocated manner is utilized to cancel unwanted noise and vibration. The test or channel processor is capable of being electrically coupled to the read/write head to be tested and of using the read/write head to write information to and read information from the recordable medium to test the read/write head.

In an alternative embodiment, an effector mechanism may be used to grasp the read write head relative to a spinning media. The effector mechanism may be controlled using an arrangement similar to the positioning assembly used for the media paddle, as discussed above. Like the above embodiment, this arrangement permits the read/write head to be tested before mounting of the head to a suspension.

Other objects, features, and advantages of the present invention will become apparent to those skilled in the art from the following detailed description and accompanying drawings. It should be understood, however, that the detailed description and specific examples, while indicating preferred embodiments of the present invention, are given by way of illustration and not limitation. Many modifications and changes within the scope of the present invention may be made without departing from the spirit thereof, and the invention includes all such modifications.

BRIEF DESCRIPTION OF THE DRAWINGS

A preferred exemplary embodiment of the invention is illustrated in the accompanying drawings in which like reference numerals represent like parts throughout, and in which:

FIGS. 2 and 2A are more detailed views of a media paddle, positioning assembly, and read/write head illustrated in FIG. 1;

FIG. 3 is a more detailed view of a flexure illustrated in FIG. 1, and FIG. 3A is a more detailed view of the flexure stage of FIG. 3, and also shows a media paddle mounted to the flexure stage;

FIG. 4 is a block diagram of the system illustrated in FIG. 1;

FIG. 5A is a graph of an excitation signal used to drive a microactuator in the system illustrated in FIG. 1, and FIG. 5B is a displacement profile that results from the excitation signal of FIG. 5A;

DETAILED DESCRIPTION OF THE PREFERRED EMBODIMENTS

Figure 1:
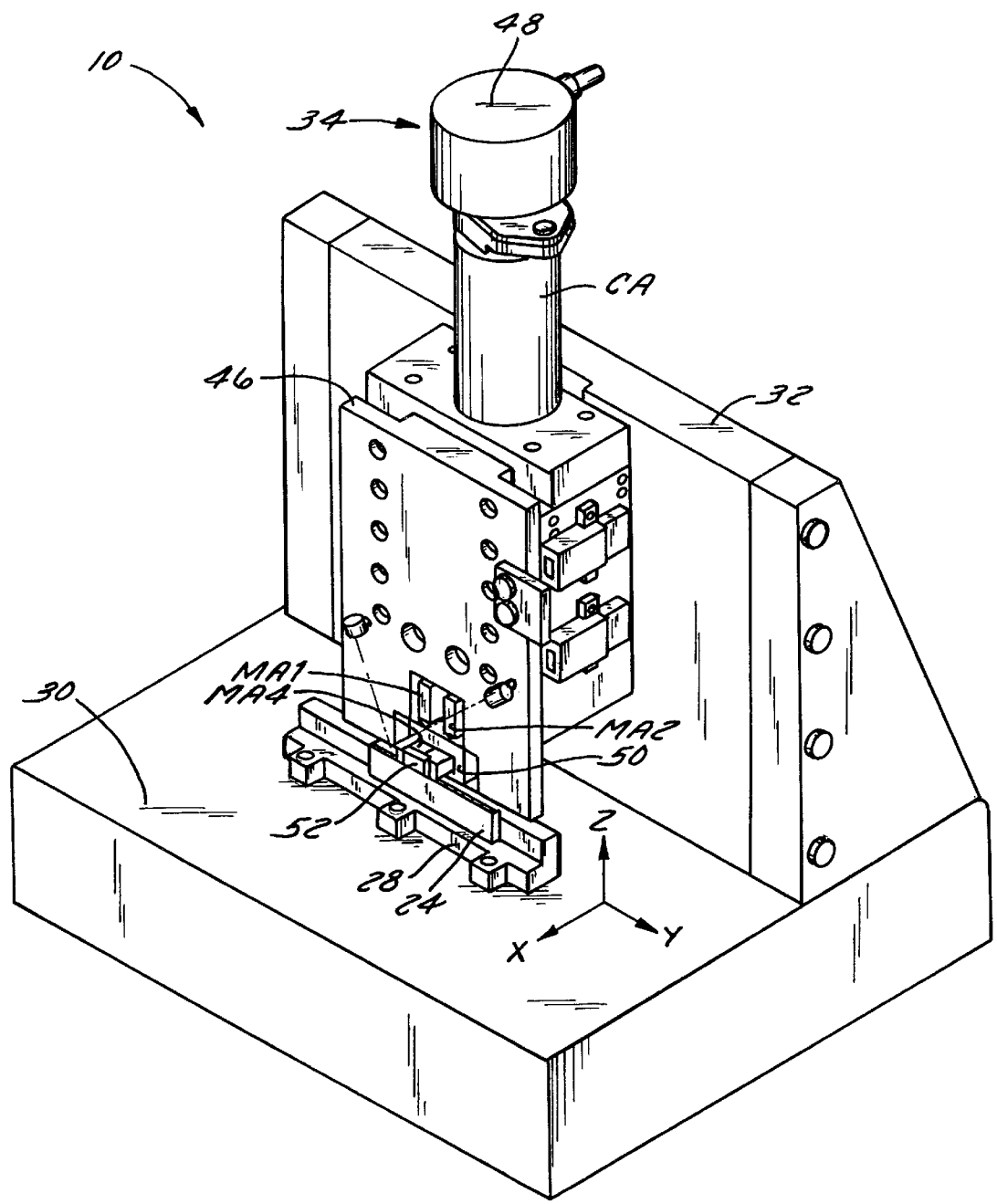
FIG. 1 is a system for testing read/write heads according to one embodiment of the present invention.
Figure 2A:
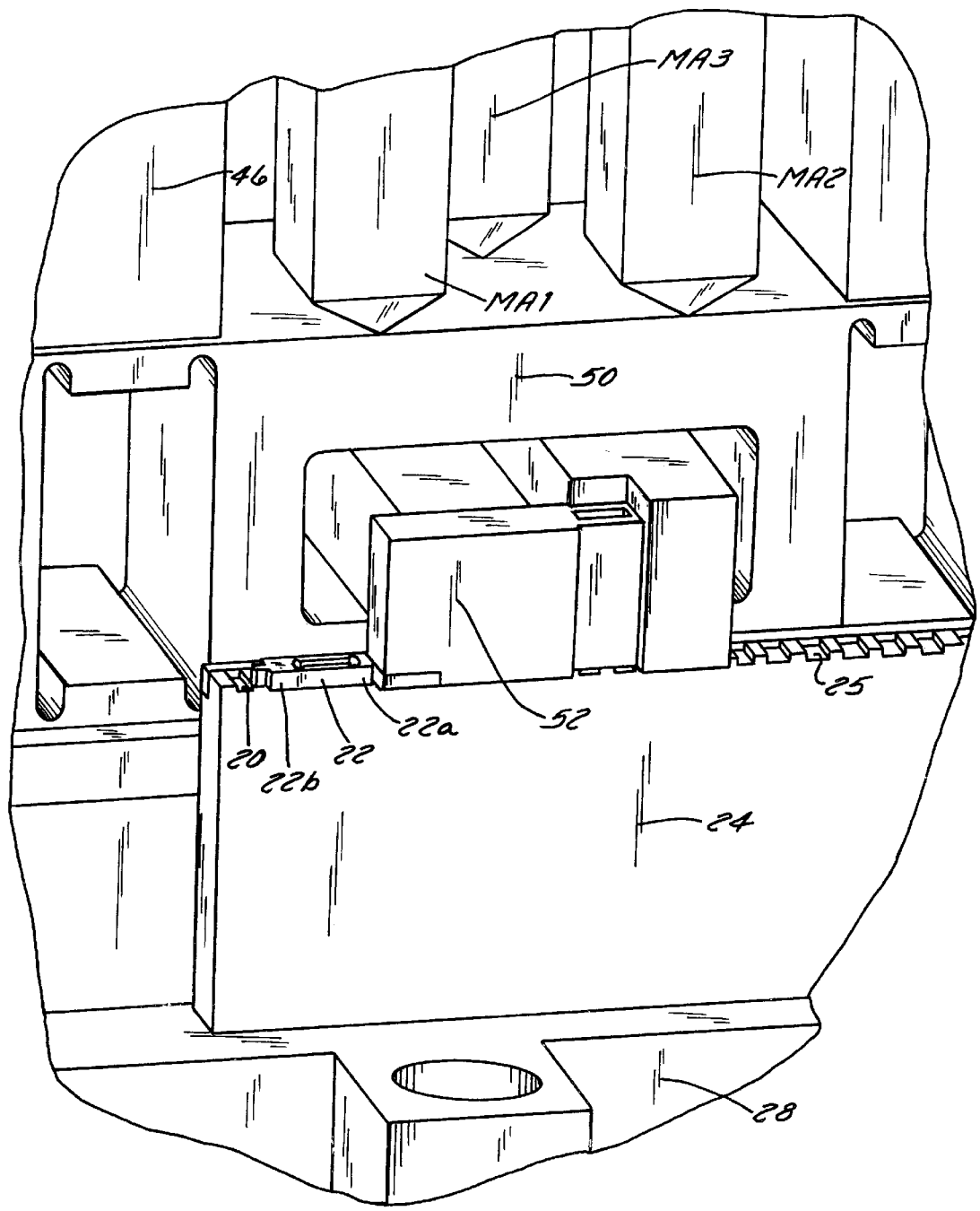

Referring now to FIGS. 1–3A, a system 10 for testing disk drive read/write heads according to one embodiment of the invention is illustrated. By way of overview, the system 10 is used to test a read/write head 20. To this end, the system comprises a media paddle 22 that moves back and forth with respect to the read/write head 20 in oscillatory fashion, such that the read/write head 20 can be tested by writing data to and reading data from the media paddle 22. Notably, with this arrangement, it is possible to test the read/write head 20 before the read/write head 20 is mounted to a suspension, thereby reducing or eliminating unnecessary waste when a given read/write head is defective.

More specifically, as previously discussed, read/write heads are manufactured using a process that results in multiple read/write heads being disposed in a row on a single substrate, typically vitrified (glass) or oxidized metals (ceramic). Typically, the slider row is adhesively mounted on a row bar, lapped, and then cut to produce discrete read/write heads. The read/write heads are then removed from the row bar and mounted to a suspension for testing.

According to the most preferred embodiment of the present invention, rather than removing a given read/write head from the row bar and mounting the read/write head to a suspension for testing, the system 10 is capable of testing the read/write head 20 while the read/write head is still mounted to a row bar 24. The row bar with individual slider mounted atop is not shown. Therefore, the system 10 is adapted for receiving the row bar 24 (or a slider bar, after the read/write 20 is cut from the row bar and mounted on a slider bar 25), which has the read/write head 20 as well as a plurality of additional read/write heads 20' mounted thereon. As can be seen therefore, the testing described herein may be performed either before or after the read/write heads are cut into discrete heads.

Testing of previously cut heads on the slider bar 25 is necessary in cases where up and down heads are built on the same row. In such cases the up heads must be tested separately from the down heads because they must be oppositely magnetically biased. Slider bar 25 has receiving slots for individual heads. Once the heads are mounted on the slider bar 25, testing of the cut heads proceeds as it would for testing of uncut heads on row bar 24.

The row bar 24 (or slider bar 25) is mounted on a row bar support 28 that in turn is mounted to a base 30 of the system 10, which is preferably constructed of a material having an extremely small coefficient of thermal expansion (e.g., $2\times10^{-7}$ ppm/° C.), such as Super Invar. The row bar support 28 is movable longitudinally (Y-direction) in motor-driven fashion relative to the base 30. The disclosure of the inventor's copending application U.S. Ser. No. 09/115,949, filed Jul. 15, 1998, entitled "Sample Stage Including a Slider Assembly," hereby expressly incorporated by reference, may be consulted in this regard. This arrangement may be used for longitudinal positioning of the read/write head 20 relative to the media paddle 22.

Also mounted to the base 30 is a support 32 that supports a media paddle positioning assembly 34. The positioning assembly 34 includes a coarse actuator CA that is used to control the coarse vertical (Z-direction) positioning of the media paddle 22. (Herein, the read/write surface of the read/write head 20 is assumed to define an X-Y plane with the Z- direction being perpendicular to that plane.) The coarse actuator CA is preferably a servo motor that drives a lead screw assembly. The coarse actuator CA drives movement of an upper stage plate 46 and can preferably be used to move the media paddle 22 over a displacement range of about 0.5 inches (12.5 mm). The coarse actuator CA is also coupled to an encoder 48 that provides vertical position feedback and that has a resolution on the order of about 0.5 nanometers.

The positioning assembly 34 also includes a plurality of microactuators MA1, MA2, MA3 and MA4, which are preferably piezoelectric transducers but which also could be another type of microactuator, such as a bimorph, voice coil or other device. The microactuators MA1–MA4 are used to control the fine vertical positioning (Z-direction) and fine pitch and roll positioning of the media paddle 22 relative to the read/write head 20. The microactuators MA1–MA3 act in concert on a flexure stage 50. Additionally, by exciting the microactuators MA1–MA3 at different levels, it is also possible to control the pitch and yaw of the media paddle 22. Preferably, the microactuators MA1–MA3 can be used to move the media paddle over a displacement range of about 15μm.

The microactuator MA4 serves as an oscillator and acts on a flexure 52 that is coupled to one end of the media paddle 22. As will be detailed below, the microactuator MA4 can be driven with a periodic signal to cause the media paddle 22 to move back and forth respect to the read/write head 20 in oscillatory fashion.

The positioning assembly 34 includes an X position sensor (not shown), a Y position sensor (not shown) and a Z position sensor 58 which are respectively used to obtain nanometer resolution X, Y and Z position measurements. The X and Y position sensors may be collocated with the piezoelectric transducers. The position sensors are preferably capacitive sensors due to ease of implementation. However, numerous position sensing schemes could be utilized, for example, an optical sensing arrangement, a static charge sensor, an eddy current sensor, or a laser with an associated split diode detector array.

The positioning assembly 34 can also be used to test read/write offset (micro-jog). In particular, the positioning assembly 34 can be used to control the position of the media paddle 22 relative to the read/write head to test for off track performance. The prevention of read/write offset by controlling the relative position of the head and the recordable medium in the context of conventional spinning disk systems is well known to those skilled in the art.

The media paddle has first and second ends 22a and 22b with a read/write surface disposed on the second end 22b. As will be detailed below, the read/write surface of the media paddle moves substantially parallel to a read/write surface of the read/write head during operation of the system 10. In particular, the second end 22b moves immediately adjacent the read/write head 20. This permits information to be written to and read from the second end 22b of the media paddle 22 during testing.

The media paddle 22 may be etched from silicon or may be wire cut from a conventional hard disk. If the media paddle is wire cut from a conventional hard disk, the media paddle would be made of disk substrate (aluminum) and would have the same thickness (750μm) as a conventional hard disk. A polymer may be sprayed on the disk substrate before wire cutting to protect the integrity of the recordable media. The advantage of using a media paddle that is wire cut from a disk substrate is that it is less expensive. The advantage of a silicon media paddle is that it is less subject to fatiguing and breaking.

Numerous different geometries for the media paddle 22 are possible. The preferred media paddle has a lateral (X) dimension of about 1 mm, a longitudinal (Y) dimension of about 5 mm, and a vertical (Z) dimension of about 0.75 mm. The media paddle 22 may also be provided with a relieved portion extending between the two longitudinal ends 22a and 22b of the media paddle to prevent adjacent heads on the row bar 24 from interfering with movement of the media paddle 22.

Referring now to FIG. 4, a block diagram of the system 10 is illustrated. As shown in FIG. 4, the system 10 also includes signal processor 60 which is preferably a microprocessor executing software or firmware. The signal processor 60 includes a position controller 62 and a read/write test procedure controller 64, both of which are also preferably implemented in software or firmware.

The position controller 62 receives position feedback from the encoder 48 and the X, Y, and Z position sensors 54, 56 and 58, and uses the position feedback to implement respective position feedback control loops to control the coarse actuator CA and the microactuators MA1–MA3. Additionally, the feedback control loops can be used to compensate for drift in the piezoelectric transducers that implement the microactuators MA1–MA4. The Z feedback control loop preferably has a bandwidth that is relatively high as compared to the oscillation frequency of the media paddle 22 (discussed below) to permit active attenuation of the vibrations in the system 10 due to the oscillation of the microactuator MA3. Also collocated in the line of actuation of MA4 is a second microactuator MA5 which acts on a flexure 53 (see FIG. 3) that is used for active vibration control and noise damping. The microactuator MA5 is driven at the same frequency and amplitude as the microactuator MA4 but 180° out of phase.

In order to cause the media paddle 22 to move back and forth laterally with respect to the read/write head 20, the position controller 62 drives the microactuator MA4 with an excitation signal V(t) having a shape such as that shown in FIG. 5A. As shown in FIG. 5B, the resulting displacement signal X(t) has a maximum value of $X_{max}$ and a minimum value of $X_{min}$. Also shown are values $X_{max}'$ and $X_{min}'$. The signal V(t) increases and decreases linearly between $X_{max}'$ and $X_{min}'$. The signal X(t) is therefore essentially a triangle wave with rounded maxima and minima (i.e., the signal X(t) is essentially a triangle wave without the highest order frequency components).

When the microactuator MA4 is driven with the excitation signal V(t) as shown in FIG. 5A, the media paddle 22 moves in the following manner. The second end 22b of the media paddle 22 moves back and forth between first and second positions corresponding to the positions $X_{max}$ and $X_{min}$ in oscillatory fashion as the microactuator MA4 oscillates. The velocity of the paddle is constant between the positions corresponding to the voltages $V_{max}$' and $X_{min}$'. A constant paddle speed is desirable because the speed of a hard disk in an operating disk drive is constant.

Preferably, the signal V(t) has a frequency of about 7–20 kHz (higher frequencies are desirable since they are less audible) and an amplitude that results in the media paddle 22 having an oscillation amplitude of about 100 to 150 mm. The frequency of oscillation is determined by the size of the media paddle, air damping and hystresis of the paddle. Different frequencies will be optimum for different materials and paddle sizes.

Assuming the media paddle 22 is driven at a frequency of about 9.0 kHz with an input excitation amplitude of 12 μm and an oscillation amplitude of about 240 μm, then the equivalent angular velocity of the media (taken at ID) paddle is about 3,600 RPM. Currently, disks in modern disk drives have an angular velocity of about 7200 RPM, with faster surface speeds anticipated in the near future. In general, it would be ideal for the media paddle to move with an equivalent linear velocity that is the same as the angular velocity times the radius of the spinning disk in the disk drive which the read/write head will be incorporated. It has been found, that the linear velocity of an actual modern disk drive is difficult to reach in practice. Even with current velocity limitations, an angular velocity of 4,000 RPM is nevertheless sufficient for the write head to write at moderate frequency and the read head (which is insensitive to speed) to read back the written data.

Although the oscillation frequency is 9–10 kHz in the preferred embodiment, the preferred oscillation frequency is affected by the particular construction of the media paddle 22. In order to maximize the oscillation amplitude that may be achieved (and therefore the equivalent surface speed), the oscillation frequency that is used to drive the microactuator MA4 should be that of the first resonant frequency of the media paddle 22 and the microactuator network MA4. This can be accomplished using an LC (inductive/capacitive) resonator (i.e., a so-called "tank circuit" or impedance matching circuit) included in the circuitry of the position controller 62 that drives the microactuators MA4 and MA5. By matching the network resonance of the oscillator with the resonance of the media paddle 22, the amplitude of the oscillations of the media paddle 22 is maximized, while the current applied to the actuator is minimized for safety and reliability reasons, and to reduce heating. This so called "tank circuit" is thus used to not only reduce current to the piezoelectric crystal but also to reduce heating while generating large amplitude displacement of the piezoelectric crystal. Net work resonance is achieved at different frequencies by changing the network inductance.

While the media paddle 22 is being caused to move back and forth with respect to the read/write head 20, the test controller 64 tests the read/write head 20. In particular, the test controller 64 is coupled to the read/write head 20 and causes the read/write head to write information to, and read information from, the second end 22b of the media paddle 22. Preferably, the writing occurs while the media paddle 22 travels at constant velocity during a first sweep of the media paddle between the first and second positions, and the reading occurs while the media paddle 22 travels at constant velocity during the ensuing sweeps.

The reading and writing is performed in accordance with numerous tests that are well known in the art of testing read/write heads. These tests include, for example, head amplitude, NLTS (non-linear transition shifts), overwrite, signal asymmetry, PW50 (pulse width), head resolution, head off track performance, read/write head offset and so on. Indeed, the ability of the system 10 to perform conventional tests using the media paddle 22 instead of a spinning disk as a recordable medium is a significant benefit of the present invention. Most manufacturers have many years of experience testing their read/write heads with a given set of tests, and therefore have acquired a significant amount of statistical data regarding the tests as they pertain to the manufacturer's own read/write head designs. Therefore, when a given read/write head is tested, the manufacturers have enough previously-compiled statistical data that they can determine with reasonable certainty whether the tested read/write head will perform satisfactorily in the disk drive over the life of the disk drive. The ability of the system 10 of FIG. 1 to perform these tests is therefore highly advantageous because it allows this previously compiled data and experience to be utilized.

To perform the testing, the signal processor 60 must be electrically connected to the read/write head 20. As previously noted, according to conventional manufacturing processes, the read/write head 20 is electronically lapped while it is mounted to the row bar 24. During the lapping process, the resistivity of the MR stripe is constantly monitored using connections that are made to the read/write head by way of a flexible circuit interconnect (not illustrated) disposed on one side of the row bar. The flexible circuit interconnect may advantageously be reutilized to establish electrical connections for purposes of testing the read/write head 20 as described herein, thereby reducing the cost of implementing the system 10. Of course, it would also be possible, though not preferred, to implement the system illustrated in FIG. 1 by using a different stable surface instead of a row bar for mounting the read/write heads within the system 10. In either implementation, the test can be performed either at the row bar level of processing using row bar 24 or at the slider level using slider bar 25.

Figure 6:
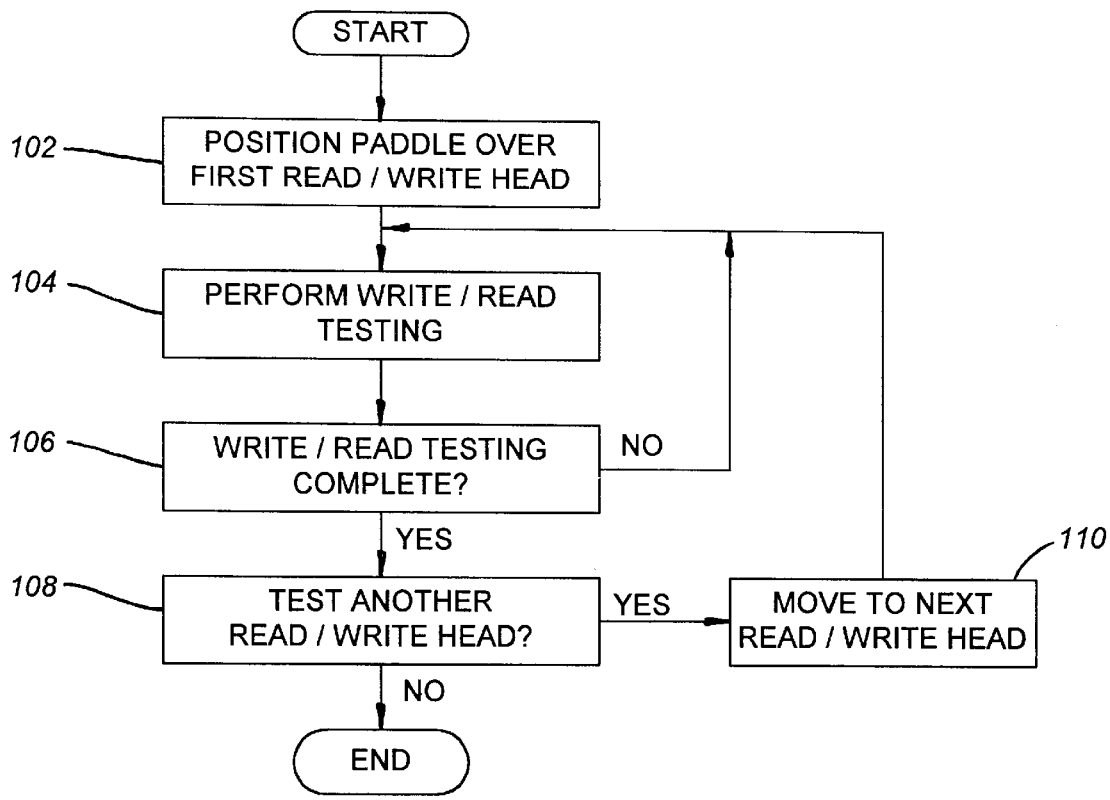
FIG. 6 is a flow chart showing the operation of the system illustrated in FIG. 1.

Referring now to FIG. 6, the operation of the system 10 is now described in greater detail. At step 102, the positioning assembly 34 positions the media paddle 22 moves over the first read/write head 20 to be tested. The positioning assembly moves the media paddle 22 to a position in which the second end 22b of the media paddle 22 is immediately above the read/write head. A preferred implementation of the positioning step is discussed in greater detail in conjunction with FIGS. 7–8, and another illustrative implementation is discussed in greater detail in conjunction with FIG. 9.

At step 104, read/write testing is performed. As previously discussed in conjunction with FIGS. 4–5, the read/write testing is performed while the media paddle 22 moves back and forth with respect to the read/write head 20, and may advantageously involve using various well known tests that have long been used in conjunction with spinstand testers.

The read/write testing continues until the write/read testing is complete for a given read/write head at step 106, where it is then determined whether to test another read/write head (e.g., the next read/write head in the row bar 24 or slider bar 25 of read/write heads) at step 108. Assuming there is another read/write head to be tested, then at step 110 the row bar 24 or slider bar 25 is moved such that the next read/write head appears under the media paddle 22. If there are no more read/write heads to test at step 108, then the end of the testing process for a given set of read/write heads disposed on a given row bar or slider bar is reached. The read/write heads that have been indicated by the testing as not being defective may then be mounted to suspensions and incorporated into a fully assembled disk drive.

Figure 7:
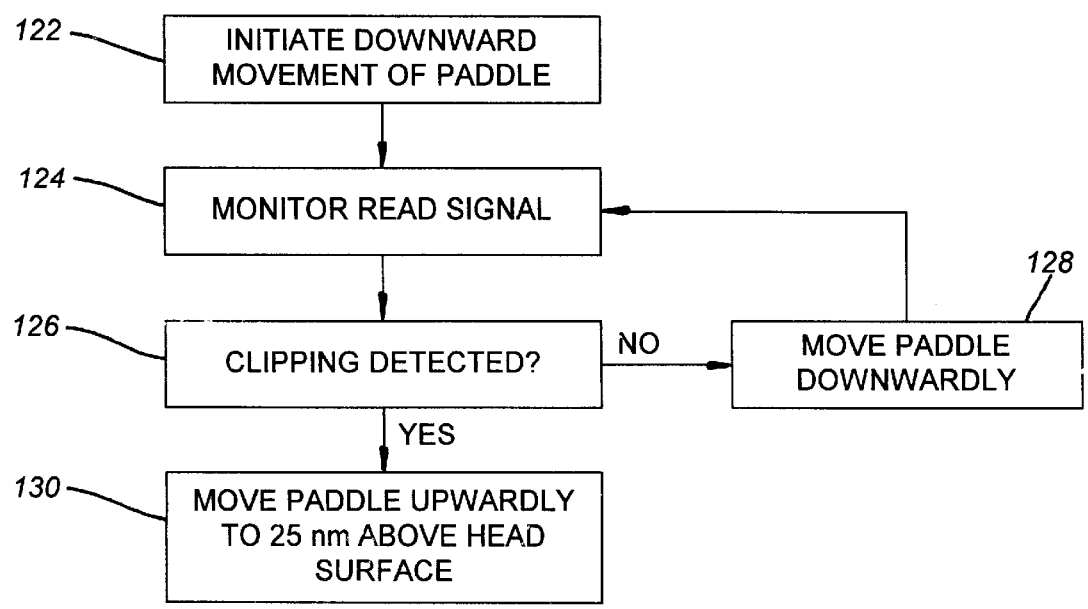
FIG. 7 is a flow chart showing a first process for achieving vertical positioning of the media paddle during the process illustrated by the flow chart of FIG. 6.
Figure 8:
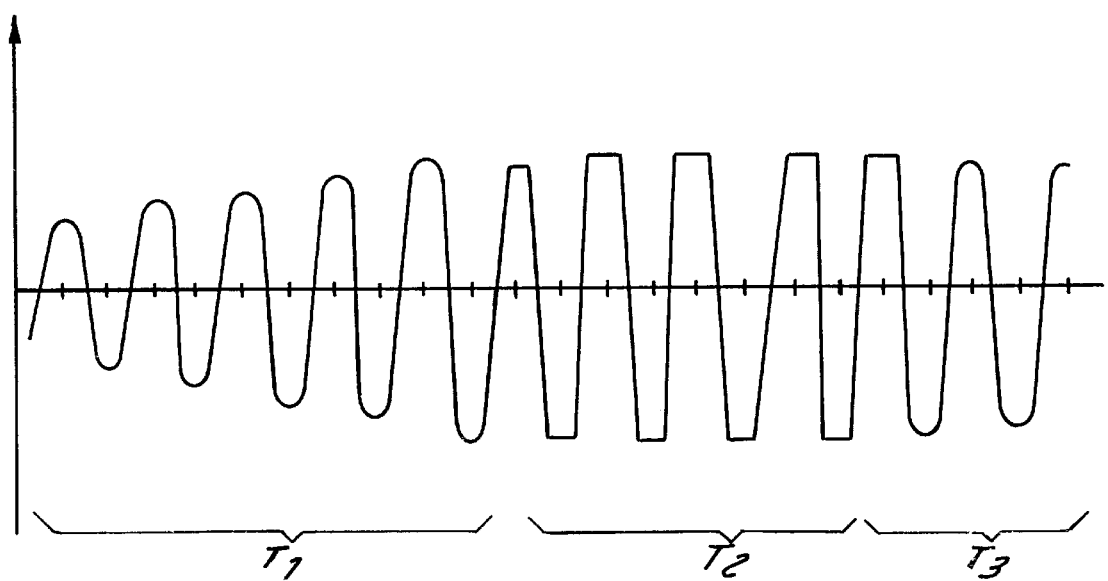
FIG. 8 is a graph of a signal received from the read head during the process illustrated by the flow chart of FIG. 7.

Referring now to FIGS. 7–8, a first implementation of the positioning step 102 is illustrated. In general, in this implementation, the media paddle 22, which has had a dc field applied to it, moves towards the read/write head 20 while the read/write head 20 attempts to read a signal from the media paddle 22. When clipping of the signal from the read/write head 20 is detected, the practical implication is that the media paddle 22 is encountering the vapor boundary of the air bearing surface of the read/write head 20. The amplitude of out-of-plane oscillation is then decreased and the media paddle is lowered again until near contact is made again and the process continues until virtual contact is achieved. The media paddle is then backed off (moved upwardly) by approximately 25 nm, or other appropriate distance, and testing is allowed to proceed.

More specifically, initially, a DC magnetic bias is applied to the media paddle. The media paddle is then oscillated out of the plane of the head while the media paddle 22 is moved downwardly toward the read/write head 20 at step 122. The signal from the read/write head 20 is then monitored at step 124.

The signal from the read/write head is shown in FIG. 8. As shown in FIG. 8, the signal generally increases during an interval $T_1$. The interval $T_1$ corresponds to the interval when the media paddle 22 continues to move downwardly towards the read/write head 20. During the interval $T_1$, therefore, the signal from the read/write head 20 is monitored at step 124 and, so long as clipping is not detected at step 126, then the read/write head is moved downwardly at step 128 and the process returns to step 124.

When clipping of the signal from the read/write head 20 is detected, the practical implication is that the media paddle 22 is encountering the air bearing surface of the read/write head. In practice, modern read/write heads are manufactured with an air bearing that in this instance prevents actual contact between the read/write head 20 and the media paddle 22. That is, the air bearing surface and the paddle surface are both of atomic-order finishes and, since the out of plane oscillation has very little energy, the vapor layer on the head and paddle will not allow contact to occur but will act as a damper). Therefore, neither the read/write head 20 nor the media paddle 22 is damaged when clipping occurs.

In this manner, an absolute indication of the position of the media paddle relative to the read/write head 20 is obtained. Once this absolute position indication is obtained, the relative position information from the Z position sensor can be used to move the paddle to a height of 25 nm, or another suitable height, above the surface of the read/write head, where testing is allowed to proceed. In this regard, it may be noted that 25 nm is a typical flying height that is used for a read/write head over the spinning disk of a hard disk drive. Of course, the media paddle 22 could also be placed at other heights.

Figure 9:
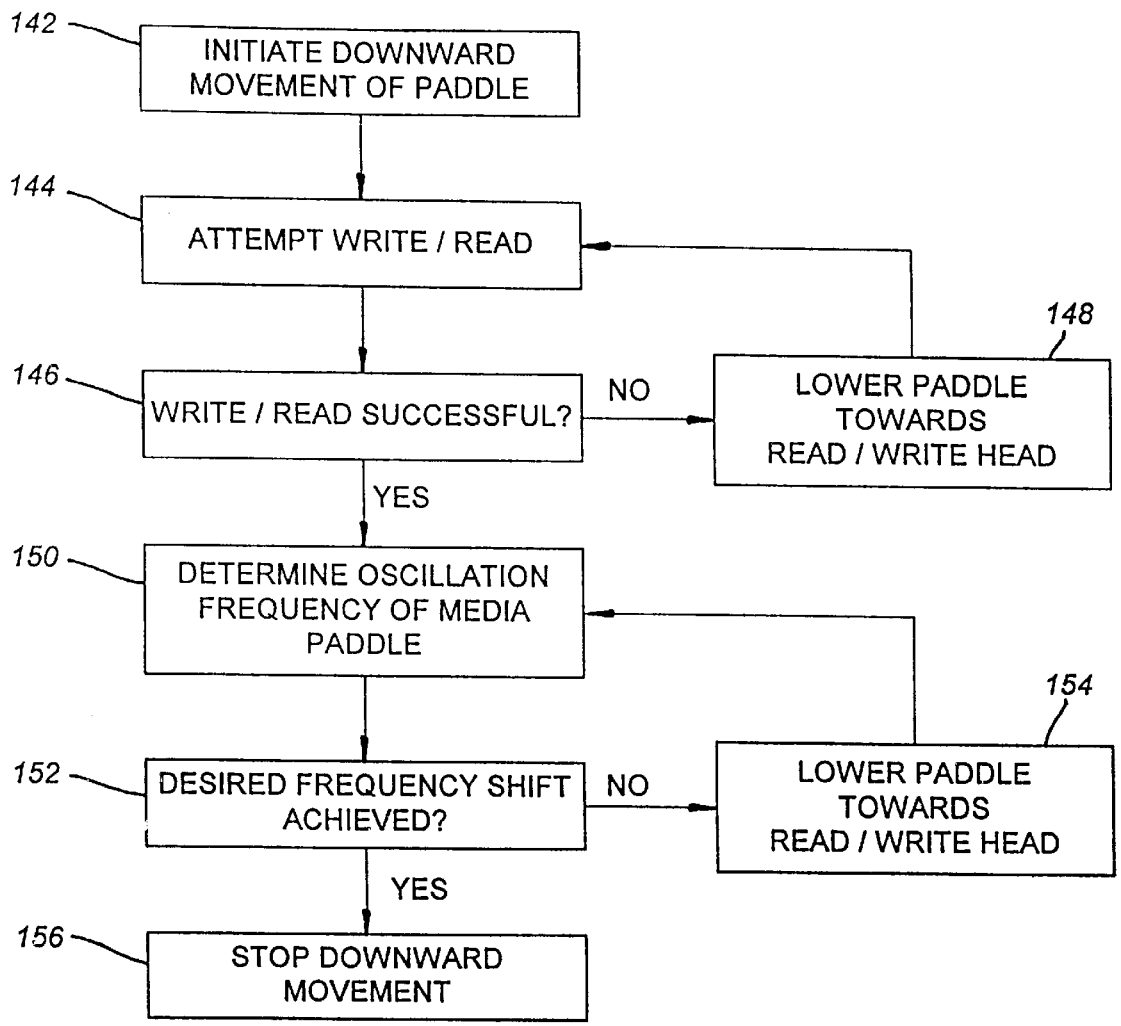
FIG. 9 is a flow chart showing a second process for achieving vertical positioning of the media paddle during the process illustrated in FIG. 6.

Referring now to FIG. 9, a second alternative implementation of the positioning step 102 is illustrated. In general, in this implementation, the vertical position is detected based on using the ability of the read/write head 20 to write to the media paddle 22 and subsequently read the written data, followed by detecting frequency shifts caused by viscous shear when the media paddle 22 gets close to the surface of the read/write head 20.

In particular, initially, the media paddle 22 is moved downwardly toward the read/write head 20 at step 142. The read/write head 20 then attempts to write to and read from the media paddle 22 at step 144. For example, using information regarding the lateral position of the media paddle 22 from the X position sensor, the write step may be performed during one sweep of the media paddle 22 and the read step may be performed during the subsequent return sweep of the media paddle 22. Preferably, the write step is performed at a lower frequency than is used in conjunction with normal disk drive operation, so that the magnetic field produced by the write head will produce a larger amplitude signal, thus being easier to find. A DC signal could also be used for coarse positioning. However, this would require DC coupling the head to the amplifier.

Alternatively, rather than using the write head to write north/south transitions to the media paddle 22, a prewritten media paddle could be utilized. In this arrangement, the north/south transitions are written by the previously-tested read/write head.

At large distances, the read/write head is too far from the media paddle 22 to successfully write to and read from the media paddle 22. Therefore, at step 146, it is determined that the write/read attempt was unsuccessful. The media paddle 22 continues to be lowered towards the read/write head 20 at step 148 and the process returns to step 144 where another write/read attempt is made.

As the media paddle 22 is lowered toward the read/write head, a point will be reached at which information may be successfully read from the media paddle. In this way, a first indication of the vertical distance between the read/write head 20 and the media paddle 22 is obtained.

The fact that the north/south transitions on the media paddle 22 are readable can then be used as a mechanism for determining the vertical position of the media paddle 22 relative to the read/write head 20. In particular, as the vertical distance between the read/write head 20 and the media paddle 22 becomes very small (e.g., less than about 25 nm), viscous sheer forces created between the media paddle 22 and the read/write head 20 act as a damper and inhibit the movement of the media paddle 22. The viscous sheer forces therefore cause the amplitude of the oscillation as well as the frequency of the oscillation to decrease. A decrease in the frequency of oscillation manifests itself in the form of a decrease in the frequency of north/south transitions detected by the read head.

Thus, the media paddle 22 continues to be lowered toward the read/write head 20. At step 150, the oscillation frequency of the media paddle is determined. Initially, the media paddle 22 will be at a sufficient vertical distance that no shear forces are created. Accordingly, at step 152, the oscillation frequency is determined not to have decreased. Therefore, at step 154, the media paddle 22 is lowered and the process returns to step 150. This process is repeated until the vertical distance between the media paddle 22 and the read/write head 20 is small enough that a predetermined reduction in the oscillation frequency is detected. The required reduction may be determined in advance through empirical testing and stored in the position controller 62. Once the required reduction is detected, downward movement of the media paddle 22 is stopped at the step 156 and testing is allowed to proceed.

The viscous sheer forces between the media paddle and the read/write head tend to cause the media paddle to move away from the plane of the head when the paddle reaches velocity. In order to prevent paddle displacement, a piezoelectric transducer is preferably provided on the side opposite of the media paddle to counteract the viscous shear forces so that the media paddle does not lift.

A second transducer may be used to detect paddle-head contact in cases where the head does not function and therefore produces no useable signal to help properly position the paddle within the head during testing. The second transducer would provide the signal necessary to prevent damage to the system and its components, which could result if a head did not provide a signal.

In the most preferred embodiment, described above, the media paddle 22 moves laterally with respect to the read/write head 20 during testing. However, it is also possible to move the media paddle 22 vertically with respect to the read/write head 20 during testing. In this arrangement, the read/write surface of the media paddle 22 moves between a first position that is adjacent the read/write surface of the read/write head 20 and a second position that is not adjacent the read/write surface of the read/write head 20. The movement of the read/write surface of the media paddle 22 is substantially perpendicular to the read/write surface of the read/write head 20 as the read/write surface of the media paddle 22 approaches the read/write surface of the read/write head 20. Thus, the media paddle 22 moves back and forth vertically instead of laterally with respect to the read/write head.

Figure 10:
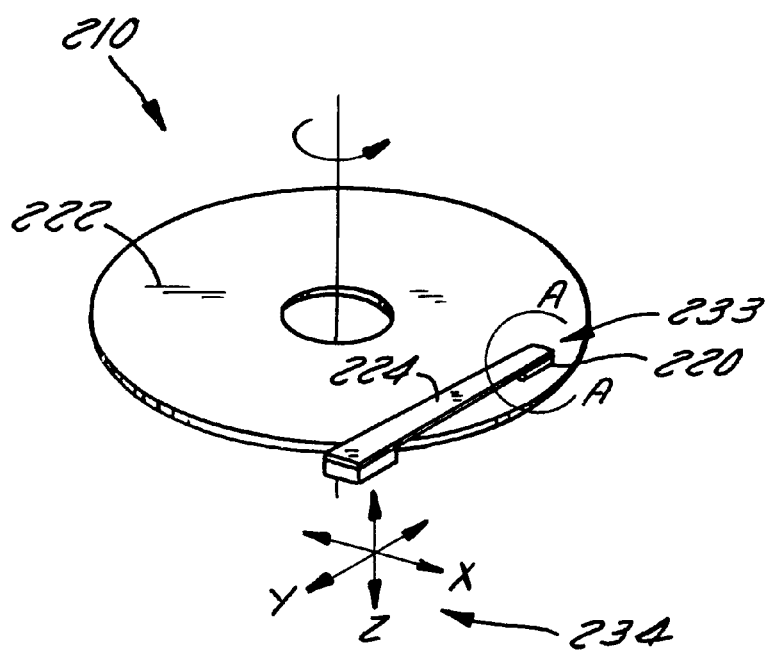
FIG. 10 is a perspective view of a spinning disk embodiment of the present invention and FIG. 10A is a more detailed view of the region A—A in FIG. 10.
Figure 10A:
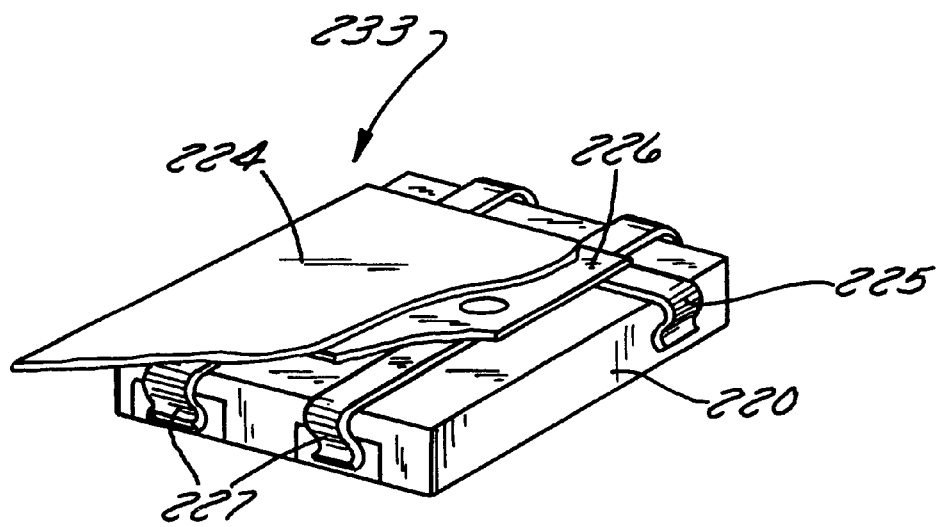

Although in the most preferred embodiments a media paddle is utilized, it is also possible to implement the present invention with a spinning disk. In a system 210 according to this embodiment, depicted in FIGS. 10 and 10A, an end effector mechanism 233 is used to grasp and make electrical connection to the read/write head 220, as well as to maintain vertical positioning of the read/write head relative to the spinning media disk 222 by moving the read/write head as the disk 222 spins. FIG. 10A is a more detailed view of the region A—A in FIG. 10. The effector mechanism 233 is supported by an end effector support 224, and is retained against the support 224 by a retainer 225, with an insulator 226 therebetween. To ensure proper electrical contact via an electrical interconnect 227, the end effector 233 should have built in probes that deflect with the head 220. The effector mechanism 233 may be controlled using a microprocessor-based XYZ movable stage 234 similar to the previously disclosed positioning assembly. Although this arrangement does not utilize a media paddle, it nevertheless permits the read/write head to be tested before mounting of the read/write head to a suspension (when the testing indicates that the read/write head is not defective).

Although in the preferred embodiment a test system/method according to the present invention is used as a complete substitute for conventional spinstand testers, it would also be possible to use the present invention in combination with a spinstand tester. For example, the read/write head could first be tested with the present invention as a preliminary screening, mounted to a suspension, and then tested with a conventional spinstand tester only after the preliminary tests indicate that the read/write head is not defective. In this way, waste would be eliminated to the extent that the first set of tests identifies defective heads before they are mounted to suspensions. Nevertheless, the manufacturer would still be able to use the exact same test arrangement with which they are accustomed for those read/write heads that finally are sold to customers.

Advantageously, according to the most preferred embodiments of the invention, it becomes possible to test a read/write head before mounting the read/write head to a suspension. Therefore, if the read/write head is found to be defective, only the read/write head is wasted and not also the suspension. Because a read/write head mounted to a suspension is approximately twice as expensive as a read/write head not mounted to a suspension, the economic waste associated with defective read/write heads can be approximately cut in half.

Additionally, this benefit can be obtained without requiring that the read/write head be mounted to another special test structure. The read/write head can be tested while it is still mounted on the row bar that is used during ordinary manufacturing of the read/write head.

In addition to this primary benefit, the most preferred embodiment of the invention also gives rise to additional benefits. In particular, it is possible to test read/write heads using sequences of read/write operations. This permits a wide array of pre-existing tests that have been developed for conventional spinstand testers to be used in connection with a testing system/method according to the present invention. As a practical matter, this benefit is extremely important to most manufacturers of magnetic heads, because most manufacturers have many years of experience testing their read/write heads with a given set of tests. Based on the results of the tests, the manufacturers have enough previously compiled statistical data that they can determine with reasonable certainty whether the tested read/write head will perform satisfactorily for the life of the disk drive. The ability to perform these tests is therefore highly advantageous because it allows this previously compiled data to be utilized. Finally, the present invention can test read/write heads much faster than conventional spinstand testers. In conventional spinstand testers, it is generally necessary average the once around the disk results during testing due to media coarsivity (variations in the magnetic hardness) and head-to-disk spacing variations. In the present invention, however, because the area of the media paddle is preferably relatively small (i.e., as compared to the area of a hard disk), the coarsivity variations are small and less averaging needs to be performed, therefore making it possible to perform some tests more quickly.

Many other changes and modifications may be made to the present invention without departing from the spirit thereof. The scope of these and other changes will become apparent from the appended claims.

I claim:

1. A method comprising:
   (A) performing dynamic electrical testing of a read/write head for a disk drive; and then
   (B) mounting the read/write head to a suspension only after the performing step indicates that the read/write head is not defective;
   wherein the performing step includes writing information to a recordable medium, and then reading the information from the recordable medium, and during the performance of the writing and reading steps, causing the read/write head and the recordable medium to move back and forth with respect to each other in oscillatory fashion.

2. A method according to claim 1, wherein a read/write surface of the recordable medium defines a first plane and a read/write surface of the read/write head defines a second plane, and wherein the performing step further comprises the step of actively controlling a distance between the first plane and the second plane using a position feedback control loop.

3. A method according to claim 2, wherein the actively controlling step comprises the step of monitoring an oscillation frequency of the oscillatory movement of the read/write head and the recordable medium with respect to each other, wherein changes in the oscillation frequency are a result of changes in viscous shear that in turn are a result of changes in the distance between the first plane and the second plane.

4. A method according to claim 1, wherein the performing step further includes:
   (1) writing information to a non-disc shaped media paddle, the non-disc shaped media paddle being the recordable medium; and then
   (2) reading the information from the non-disc shaped media paddle.

5. A method according to claim 1, wherein the performing step further includes:
   maintaining the read/write head in close proximity to the recordable medium as the recordable medium moves relative to the read/write head, the maintaining step being performed by an effector mechanism that grasps the read/write head.

6. A method according to claim 1, wherein the motion of the read/write head is planar and the motion of the recordable medium is planar.

7. A method according to claim 6, wherein the plane of motion of the read/write head is substantially parallel to the plane of motion of the recordable medium.

8. A method according to claim 6, wherein the performing step further includes correcting the motion of the recordable medium if the motion of the recordable medium is out of the plane.

9. A method according to claim 8, wherein the correcting step includes generating a signal indicative of the motion of the recordable medium when the recordable medium is out of the plane and transmitting the signal through a feed forward control loop to a position controller.

10. A method of testing a read/write head for a disk drive, the method comprising:
   (1) causing the read/write head and a recordable medium to move back and forth with respect to each other in oscillatory fashion, wherein the recordable medium oscillates and the read/write head is generally fixed; and
   (2) testing the read/write head while the read/write head and the recordable medium are being caused to move with respect to each other;
   wherein the recordable medium is a media paddle having a first end and a second end, the first end of the media paddle is fixedly mounted to a support structure, the second end moves immediately adjacent the read/write head, and the second end moves back and forth between a first oscillation position and a second oscillation position.

11. A method according to claim 10, wherein the testing step includes:
   (1) writing information to the second end of the media paddle using the read/write head; and then
   (2) reading the information from the second end of the media paddle using the read/write head.

12. A method according to claim 11, wherein the writing step occurs at least substantially entirely during a first sweep of the read/write head between the first and second positions, wherein the reading step occurs at least substantially entirely during a second sweep of the read/write head between the first and second positions.

13. A method according to claim 11, further comprising the step of driving an oscillator with an excitation signal, and wherein the excitation signal is a non-sinusoidal signal that causes the second end to move with an approximately constant velocity during a substantial portion of the trajectory between the first and second positions.

14. An apparatus for testing a read/write head of a disk drive, the apparatus comprising:
   (A) an oscillator, the oscillator having a surface that oscillates in at least one dimension when the osciallator is driven with a periodic signal;
   (B) a recordable medium mechanically coupled to the oscillator, the recordable medium being moveable in accordance with the movement of the surface of the oscillator, such that the recordable medium moves back and forth with respect to the read/write head in oscillatory fashion when the oscillator is driven with the periodic signal;
   (C) a processor, the processor being capable of being electrically coupled to the read/write head to be tested and of using the read/write head to write information to and read information from the recordable medium to test the read/write head.

15. An apparatus according to claim 14, wherein the recordable medium is mechanically coupled to the oscillator by way of a flexure.

16. An apparatus according to claim 14, wherein said oscillator is a first actuator, and wherein said apparatus comprises a second oscillator, said second oscillator oscillating at approximately the same frequency and amplitude as said first oscillator and approximately 180° out of phase with said first oscillator.

17. An apparatus according to claim 14, further comprising an inductive-capacitive resonator circuit which is coupled to said oscillator.

\* \* \* \* \*